UNITED STATES PATENT OFFICE.

PAUL R. HERSHMAN, OF CHICAGO, ILLINOIS, ASSIGNOR TO THE MINERAL PRODUCTS COMPANY, OF NEW YORK, N. Y., A CORPORATION OF WEST VIRGINIA.

PRODUCTION OF REFRACTORIES.

1,240,569.        Specification of Letters Patent.        Patented Sept. 18, 1917.

No Drawing.        Application filed July 19, 1915. Serial No. 40,697.

*To all whom it may concern:*

Be it known that I, PAUL R. HERSHMAN, a citizen of the Empire of Austria-Hungary, residing in Chicago, county of Cook, State of Illinois, have invented certain new and useful Improvements in the Production of Refractories; and I do hereby declare the following to be a full, clear, and exact description of the invention, such as will enable others skilled in the art to which it appertains to make and use the same.

In Letters Patent of the United States, No. 1,135,182, issued under date of April 13, 1915, and in an application Serial No. 878,313, filed December 21, 1914, I have described the production of refractories which will resist temperatures as high as, and even in excess of 2200° C.

In the production of these refractories I have proposed the employment of glue, tar, or the like. It is found that, under some conditions of practice, it is desirable and useful to materially increase the mechanical strength possessed by the refractories in their course of manufacture, with particular reference to the interval represented by their passage from about 500° C. to 1500° C.; that is to say, during the interval between the substantial decomposition of the glue, tar, or similar carbonaceous binder, and the time when the particles of the mixture begin to sinter or frit together.

To this end, I associate with or incorporate in the binder a material which will serve as an efficient binding agent over the period referred to, and which will preferably be thereafter decomposed and driven off, so that it will not lower the heat resistivity of the final product. The invention is particularly applicable to those instances wherein metallic oxids, and especially aluminum oxid, is employed, together with carbon, in making up the refractories, and wherein the final reaction resulting in the superficial sintering of the particles does not begin below 1450° C.–1500° C.

To overcome the tendency of softening and deformation of the refractories, up to that temperature, I incorporate in the binder a small quantity of a material which is capable of forming a cementing union with one or more of the constituents of the mass. The cementing effect produced by this added material gives sufficient cohesion to the mass to preserve it against deformation after the carbonaceous elements of the binding agent have disappeared and during the considerable interval existing up to the time when sintering begins, whereupon most of the added cementing material is volatilized and passes off.

I have further discovered that it is possible to regulate the degree of shrinkage of the refractories by varying the proportions of carbon employed in making up the mass, and consequently varying the density of the finished product resulting from subjecting the mass to the temperature required in the production of the bricks or other refractories.

Thus, I have ascertained that the addition of say 15 parts by weight of carbon to 100 parts by weight of alumina will result in a final product which is very dense and non-porous, and which will shrink about 10% in linear dimensions, during the manufacture. I have also found that, by increasing the proportion of carbon from 15 parts by weight up to 30 parts by weight, the density and porosity of the final product increases, and that, toward the upper limit of this increase in percentage of carbon, there is practically no shrinkage at all in the final product. In this connection, it will be understood that in determining the percentage of carbon to be introduced into the mass, for the production of a brick of given density and porosity, note should be taken of the amount of free oxygen or of carbon dioxid introduced with the heating gases, for the reason that the presence of free oxygen or carbon dioxid causes a partial combustion of the carbon present in the mass, with an accompanying loss thereof which must be anticipated in making up the original mixture.

As examples of the practice of the invention I may instance the following typical illustrations:

(1)—100 pounds of alumina (preferably obtained from the calcining of crude alunite) is combined with 12 pounds of coke, 5 pounds of hard pitch, 2 pounds of calcium sulfite and 25 pounds of the glue-like concentrated "tank water" of the slaughter-house industry; or (2)—100 pounds of alumina (preferably obtained from the calcining of crude alunite) is combined with 30 pounds of coke, 5 pounds of hard pitch, 2 pounds of calcium sulfite, and 30 pounds of the said concentrated "tank water".

In both cases all of the dry material used should be reduced to a fineness of 100 mesh or less, and, after being well mixed with the remaining ingredients, the whole is pressed into the desired shape, in any suitable brick press, using a pressure of about 3000 pounds to the square inch.

The heating of the pressed bricks is carried on in an atmosphere of gas and proceeds slowly up to about 1850° C. The heat may be supplied to the mass either electrically, (as, for instance, by an electric arc, or by an electric resistor), or it may be supplied wholly or partly by the gas itself preliminarily heated to the desired temperature in a regenerative furnace or the like. The heating gas employed preferably contains a large amount of carbon monoxid, together with hydrocarbons. In case generator gas or other gases containing considerable amounts of nitrogen are used, the refractories formed will contain a small amount of nitrogenous compounds, as the temperature rises above 1500° C.; but finally, at the highest temperatures employed, a reaction takes place characterized by a change in the physical properties of the material and accompanied more or less by sintering. The nitrogenous products formed in the first instance are again decomposed and do not reappear in the final product. I have also found that the speed of decomposition of the nitrogenous products increases with the pressure used in the shaping of the material into brick form, and likewise with the quantity of the carbon-containing gases introduced.

By the procedure described, the melting point of the finished product is raised to a remarkable degree. For instance, in the case of crude bauxite, high in iron, it was observed that with the employment of 20 parts by weight of carbon, 2 parts by weight of calcium sulfite and 30 pounds by weight of concentrated "tank water," together with 100 parts by weight of bauxite, the resultant product had a melting point somewhat higher than 2125° C. It was also found that bricks made from aluminum oxid obtained from the calcining of alunite and briqueted in the proportion of 100 pounds of aluminum oxid, 15 pounds of carbon, 1 pound of calcium sulfite, and 25 pounds of concentrated "tank water," gave a product having a melting point as high as 2250° C.

As hereinbefore indicated, should any free oxygen or carbon dioxid be present in the heating gases, great care must be taken that a surplus of carbon be present at the time when the final reaction takes place so that non-oxidizing conditions will be maintained; otherwise, a product will result which is not materially higher in melting point than aluminum oxid purified by any suitable method. On the other hand, after the reaction resulting in the final product has taken place, the final product formed is found to be no longer attacked by oxygen or carbon dioxid, even when these gases are introduced at the highest temperature employed in the manufacture of the refractories.

What I claim is:

1. The method of producing heat resisting bodies, which comprises raising to a high temperature in a non-oxidizing atmosphere a molded mass containing a refractory metal oxid, carbon, and a binding agent associated with an ingredient which exercises a cementing effect upon the particles of the molded mass up to the time when they begin to sinter or frit together.

2. The method of producing heat resisting bodies, which comprises raising to a high temperature in a non-oxidizing atmosphere a molded mass containing a refractory metal oxid, carbon, and a binding agent associated with an ingredient which exercises a cementing effect upon the particles of the molded mass up to the time when they begin to sinter or frit together and finally substantially driving off the cementing ingredient.

3. The method of producing heat resisting bodies, which comprises raising to a high temperature in a non-oxidizing atmosphere a molded mass containing aluminum oxid, carbon, and a binding agent associated with an ingredient which exercises a cementing effect upon the particles of the molded mass up to the time when they begin to sinter or frit together.

4. The method of producing heat resisting bodies, which comprises raising to a high temperature in a non-oxidizing atmosphere a molded mass containing aluminum oxid, carbon, and a binding agent associated with an ingredient which exercises a cementing effect upon the particles of the molded mass up to the time when they begin to sinter or frit together and finally substantially driving off the cementing material.

5. The method of producing heat resisting bodies, which comprises raising to a high temperature in a non-oxidizing atmosphere a molded mass containing aluminum oxid, carbon, and a binding agent, and proportioning the amount of carbon employed, in such manner that at the highest temperatures employed there will result a decided shrinkage and increase in density of the final product.

6. The method of producing heat resisting bodies, which comprises molding, at a pressure of approximately 3000 pounds to the square inch, a mixture of aluminum oxid, carbon, and a binding material containing an ingredient adapted to cement the particles of the molded mass as against deformation at temperatures ranging upward to approximately 1450° C., and heating the molded body up to a temperature at which the said cementing ingredient is practically driven off.

In testimony whereof I affix my signature.

PAUL R. HERSHMAN.